(12) United States Patent
Jagow et al.

(10) Patent No.: US 8,690,488 B2
(45) Date of Patent: Apr. 8, 2014

(54) AIR DISTRIBUTION FOR AN AIR SEEDER

(75) Inventors: Scot Jagow, St. Brieux (CA); Haydon Rice, St. Brieux (CA); Bob Cochran, St. Brieux (CA); Bryan Cresswell, St. Brieux (CA)

(73) Assignee: Bourgault Industries Ltd., St. Brieux, SK (CA)

( * ) Notice: Subject to any disclaimer, the term of this patent is extended or adjusted under 35 U.S.C. 154(b) by 56 days.

(21) Appl. No.: 13/481,326

(22) Filed: May 25, 2012

(65) Prior Publication Data

US 2012/0301231 A1    Nov. 29, 2012

(30) Foreign Application Priority Data

May 27, 2011   (CA) ..................................... 2741267

(51) Int. Cl.
*B65G 51/18*   (2006.01)

(52) U.S. Cl.
USPC ........... 406/181; 406/183; 406/155; 406/157; 111/175

(58) Field of Classification Search
USPC ........... 406/181, 183, 155, 157; 111/175, 176
See application file for complete search history.

(56) References Cited

U.S. PATENT DOCUMENTS

| | | | | |
|---|---|---|---|---|
| 5,265,547 A * | 11/1993 | Daws | ............................ | 111/175 |
| 6,283,679 B1 * | 9/2001 | Gregor et al. | .................... | 406/26 |
| 7,373,890 B2 * | 5/2008 | Kowalchuk | .................... | 111/175 |
| 7,555,990 B2 | 7/2009 | Beaujot | | |
| 7,690,440 B2 | 4/2010 | Dean et al. | | |
| 8,001,914 B2 * | 8/2011 | Peterson et al. | ............... | 111/175 |
| 2004/0250742 A1 * | 12/2004 | Fuessel et al. | ................ | 111/175 |
| 2007/0022928 A1 * | 2/2007 | Kowalchuk | .................... | 111/175 |
| 2012/0312211 A1 * | 12/2012 | Hubalek et al. | ................ | 111/175 |

* cited by examiner

*Primary Examiner* — Joseph Dillon, Jr.
(74) *Attorney, Agent, or Firm* — Frost Brown Todd LLC

(57) ABSTRACT

An air distribution apparatus has a manifold body, and ports defined through walls thereof, with a delivery conduit connected to each port. A port valve is configured to connect and disconnect the delivery conduit to the interior of the manifold body. A supply conduit delivers a product air stream with agricultural products entrained therein to the interior of the manifold body. The supply conduit extends vertically up from the manifold to a curved elbow and then extends horizontally from the elbow. An exhaust orifice is defined in the inner radius of the elbow. When an exhaust valve is open, a selected flow of pressurized air flows from the supply conduit through the exhaust orifice. The port valve and exhaust valve are controlled such that when the port valve closes, the exhaust valve opens. The exhaust air can be directed into the delivery conduits to clear product therefrom.

13 Claims, 6 Drawing Sheets

Figure 7:
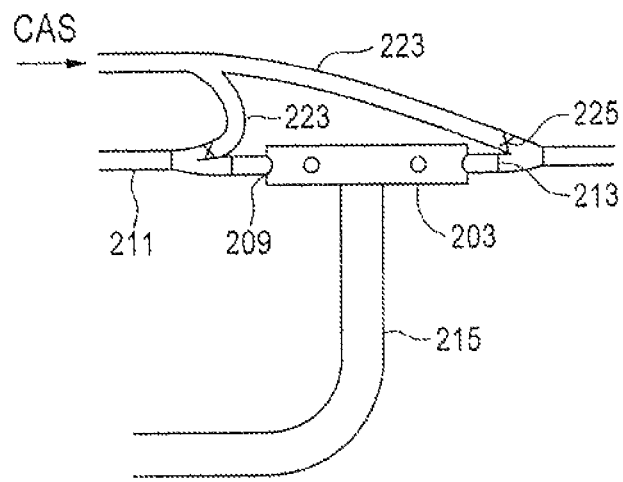
Figure 8:
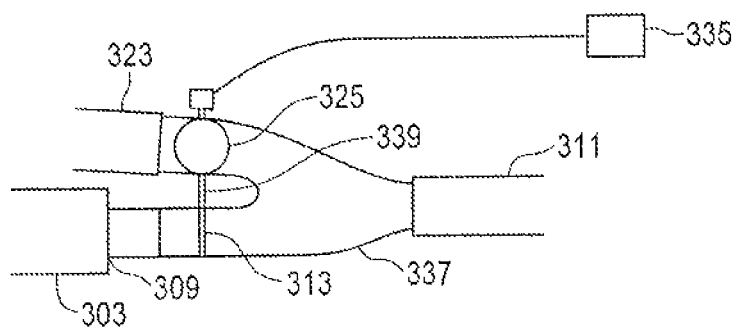

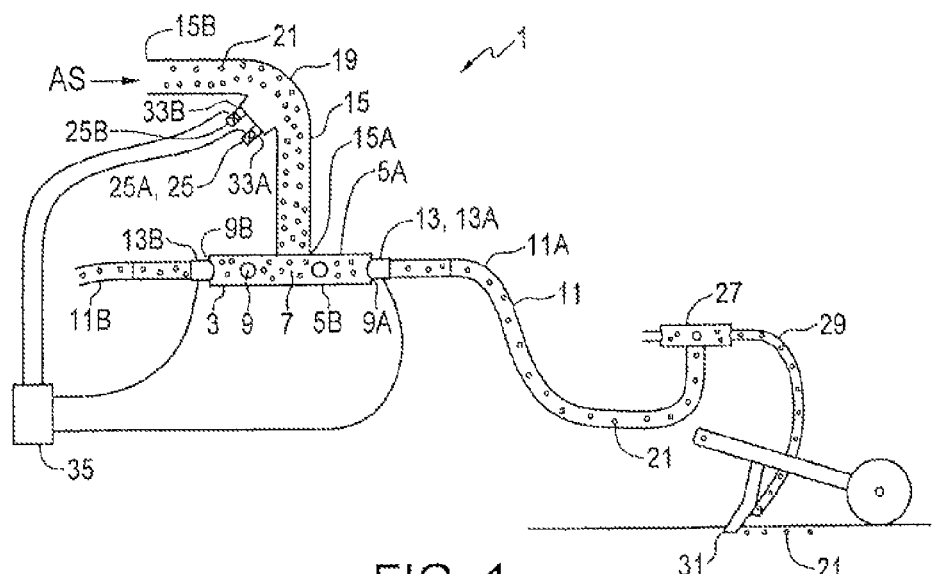
FIG. 1
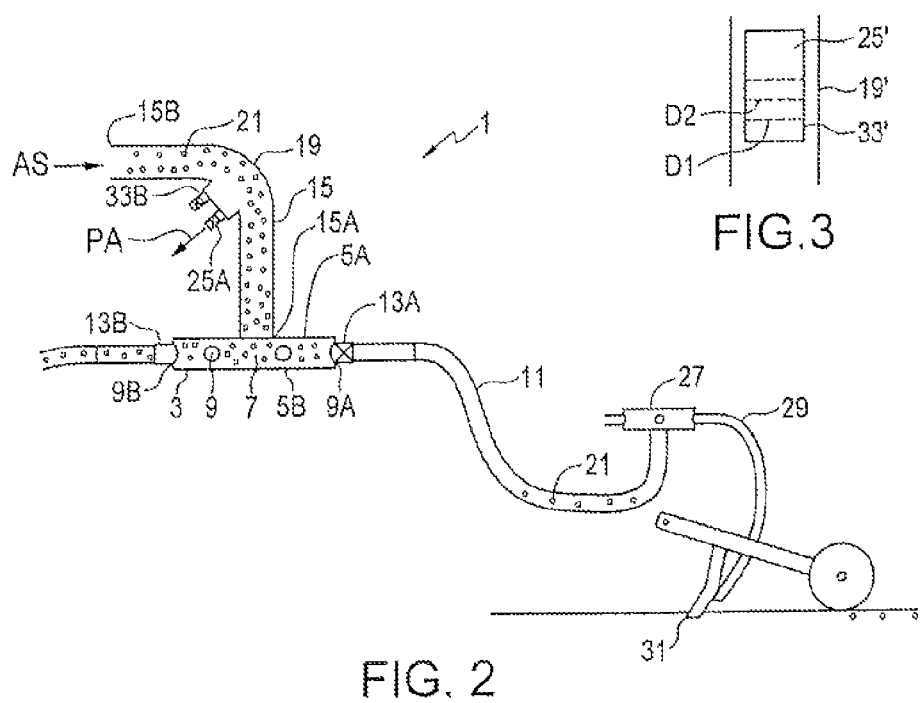
FIG. 2
FIG. 3

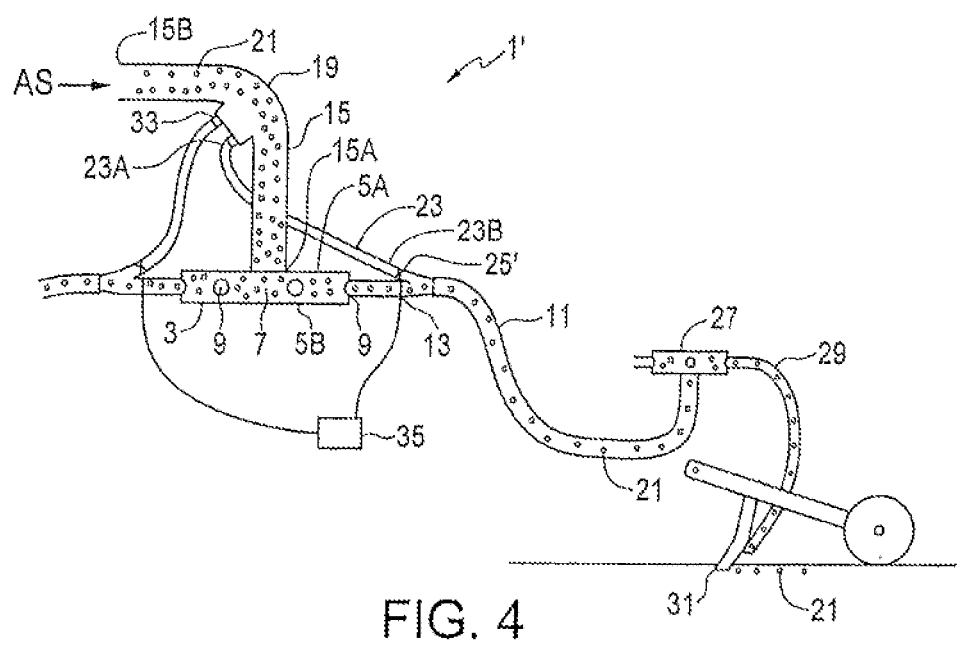
FIG. 4
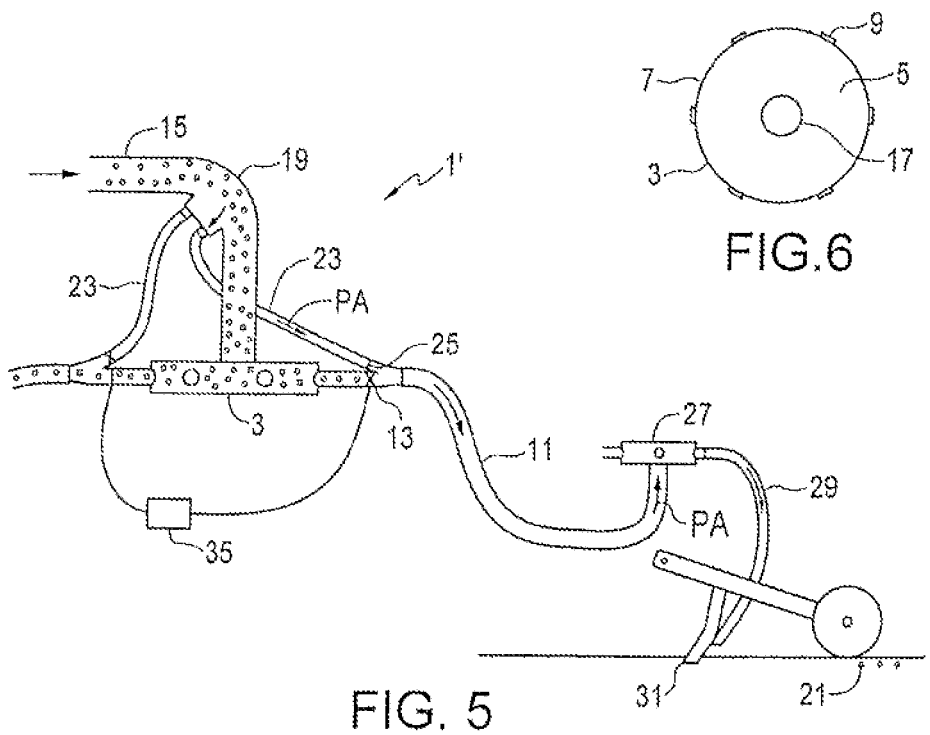
FIG. 5
FIG. 6

AIR DISTRIBUTION FOR AN AIR SEEDER

This application claims priority to Canadian Patent Serial No CA2741267, "Air Distribution for and Air Seeder," filed May 27, 2011.

This invention is in the field of agricultural air seeders and in particular an air distribution apparatus with valves on the ports to control product distribution and an exhaust to maintain critical velocity of the air stream.

BACKGROUND

Agricultural air seeders include generally an implement frame and a plurality of furrow openers spaced across a width of the frame, and movable to a lowered operating position where the furrow openers engage the ground to create furrows as the frame moves along a field. Agricultural products such as seed, fertilizer, and the like are carried in tanks mounted on the frame or a cart pulled with the frame and distributed to the furrow openers by a product distribution system where one or more fans create one or more air streams and metering devices dispense the agricultural products into the air streams and the products are carried through an air distribution network made up of conduits and manifolds to the furrow openers, and then into the furrows. Furrow opener assemblies often create two (or more) separate furrows, and separate air streams carrying different agricultural products are connected so as to deposit the different products in the separate furrows.

There are different types of product distribution systems used on present day air seeders. In a Class A product distribution system, all agricultural products destined for a given furrow are metered into a single air stream in a primary supply conduit connected to a primary manifold. Such manifolds are generally a thin cylinder with an inlet in a top or bottom of the cylinder connected to the supply conduit to receive the air stream carrying agricultural products, and a number of outlet ports equally spaced around a circumferential wall. Flat fan manifolds are also known where the supply conduit directs the product air stream into one end of the a flat manifold body which divides the product air stream into channels with ports at the ends of the channels on the opposite end of the manifold body. Delivery conduits are connected to each port to carry the air stream further downstream to another manifold or to a furrow opener as the case may be.

In a Class A product distribution system the primary manifold provides primary division of the air stream and the agricultural products carried therein by dividing and directing the air stream into a number of different delivery conduits, each of which is in turn connected to a secondary manifold. The secondary manifold provides secondary division of the air stream and the agricultural products carried therein by dividing and directing the air stream into a number of different secondary conduits, each of which is connected to a furrow opener to direct the air stream, and the agricultural products carried therein, into a selected furrow.

In a Class B product distribution system the metering device itself is divided into a number of sections such that primary division of the agricultural products takes place prior to the products entering the air stream. Each conduit from a meter section is connected to a manifold which provides secondary division of the air stream and the agricultural products into a number of different secondary conduits, each of which is connected to a furrow opener as in the Class A system.

In a Class C system, all division of the agricultural products takes place at the metering device. The metering device is divided into a number of sections equal to the number of furrow openers, and a single conduit connects each meter section with each furrow opener.

Present day air seeders are often 80 or more feet wide, and a problem arises when a strip of a field to be seeded is much narrower than the seeder, as a considerable width of the field will be overlapped and seeded twice. It is most undesirable to leave even a narrow strip of a field unneeded as, without crop competition, weeds will flourish in the strip providing seed for future years weed growth. Seeding the adjacent field area twice however wastes valuable seed and fertilizer, and the crop on the twice seeded field area generally has reduced yield and/or quality.

Thus it is desirable to provide a means to stop the delivery of agricultural products to furrow openers in the overlap area by providing individual control of the delivery of agricultural products to a number of different sections of furrow openers across the width of the air seeder. U.S. Pat. No. 7,690,440 to Dean et al. discloses a Class B product distribution system where the metering device is divided into a number of sections, and where gates are provided at each meter section that may be opened or closed to start or stop product flow from each meter section. The air seeder is configured so that each meter section supplies agricultural products to a downstream manifold and from there to furrow openers that are laterally arranged in order across a section of the width of the seeder so that stopping product flow to any manifold stops product flow to a section of the air seeder. Thus as the strip of field to be seeded narrows to less than the width of the air seeder, product delivery is stopped to sections of the air seeder passing over previously seeded ground.

U.S. Pat. No. 7,555,990 to Beaujot takes a different approach by providing gates on the outlet ports of the manifolds. The described system has a single manifold downstream from the metering device, and gates are provided on each port of the manifold. Each port can thus be opened or closed, such that the delivery of the air stream with the entrained agricultural products to each furrow opener can be stopped or started. In one version of the Beaujot system, each delivery port is paired with a corresponding recirculating port that is connected to a conduit to carry product that would ordinarily be carried to the furrow opener back to the tank containing the particular agricultural product. Thus when a port is closed, the corresponding recirculating port is opened and product is carried back to the tank from which it came.

SUMMARY OF THE INVENTION

It is an object of the present invention to provide an air distribution manifold apparatus for an air seeder that overcomes problems in the prior art.

Thus in the prior art sectional control systems the delivery of agricultural products to each section of furrow openers can be controlled before the products enter the product air stream by stopping and starting the metering devices feeding the products into the air stream as in the system of Dean et al, or after the products have entered the air stream by opening and closing the ports on a manifold as in the system of Beaujot.

When some of the manifold ports are closed, the flow of air through the downstream delivery conduits connected to the furrow openers is shut off and the air stream entering the manifold then must flow out through the open ports such that an increased amount of air flows out each of the open ports. As the number of closed ports increases, more and more air tries to flow through the open ports and back pressure in the manifold increases. With the fans most commonly used in air seeders to generate the air streams used for distributing agricultural products through conduits, as the back pressure in the conduits increases, the volume of air moved decreases, and the velocity of the moving air decreases.

Thus in the system of Beaujot, as back pressure in the manifold increases, the volume of the air stream entering the manifold is reduced, and the velocity of the air flowing through the supply conduit feeding the manifold is reduced. The air stream must move through the supply conduit at a minimum velocity that sufficient to keep the agricultural products entrained in the air stream suspended therein. This critical velocity will be higher in a vertical section of the supply conduit than in a horizontal section, as the air stream must move the agricultural products upward against the force of gravity as opposed to moving the product laterally.

If the velocity drops below this "critical" velocity, the particles of agricultural product will drop out of the air stream. Thus in the Beaujot system, as ports are closed the velocity of the air stream will at some point fall below the critical velocity, the agricultural products will start to drop out of the air stream, and lay in the bottom of the supply conduit.

Constant volume blowers are also available for air seeders. Unlike the commonly used fans, where as the pressure in the conduits increases the volume of air moved decreases, these blowers provide a constant volume of air as the pressure downstream rises. This will maintain the critical velocity of the air stream in the supply conduit since the same volume of air will be moving therethrough. If a constant volume of air enters the manifold, however it must leave the manifold through whatever ports are open. As the number of open ports decreases, more air must flow through each open port and the downstream delivery conduit connected thereto, and the speed of the air stream in these delivery conduits will thus increase.

A well known problem in air seeders is that when the speed of the air stream to the furrow openers is excessive, the agricultural products carried in the air stream can be blown out of the furrow, or can be travelling so fast that they bounce out of the furrow. Thus as ports are closed, the speed of the air stream in the delivery conduits increases, and at some point an unacceptable amount of agricultural products will not be placed in the furrows.

Also in the Beaujot system, as ports are closed the metered rate of dispensing product into the air stream must be reduced proportionally to keep the application rate constant. In order to accomplish this with the single meter disclosed, a single large manifold is shown, which apparently feeds all the furrow openers.

A further problem arises when a port is closed and the flow of air through the downstream delivery conduits connected to the furrow openers is shut off. These delivery conduits very often do not slope down all the way from the manifold to the furrow opener, but have low areas where the conduit dips down and then rises. When the manifold ports are blocked by the gates, the air is substantially instantly cut off and agricultural products in the downstream conduit are no longer carried along by the air stream but simply fall down, and can thus gather into one of these low areas and block the conduit. Then when the port gate is opened again the air stream will not flow through the blocked conduit and the furrow opener will receive no product.

In some prior art systems the air stream carrying the agricultural products is directed back to the tanks carry the products however the conduits downstream from the closed port are still cut off from any air stream. This return to tank method may work when a single granular product is metered into an air stream, but will not work when two or more products have been metered together into the same airstream. The returned product is then mixed together and cannot be separated and returned to the tank it was metered from.

In a first embodiment the present invention provides an air distribution apparatus comprising a manifold body, and a port defined through a wall of the manifold body. A delivery conduit is connected to the port, and a port valve is configured such that when the port valve is open the delivery conduit is connected to an interior of the manifold body through the port, and such that when the port valve is closed, the delivery conduit is disconnected from the interior of the manifold body. A supply conduit is connected at an output end thereof to the interior of the manifold body, and is connected at an input end thereof to receive a product air stream with agricultural products entrained therein. The supply conduit extends substantially vertically up from the manifold body to a curved elbow and then extends substantially horizontally from the elbow. An exhaust orifice is defined in the elbow at an inner radius of the elbow, and an exhaust valve is configured such that when the exhaust valve is open, a selected flow of pressurized air flows from an interior of the supply conduit through the exhaust orifice, and such that when the exhaust valve is closed, pressurized air from the interior of the supply conduit is prevented from flowing through the exhaust orifice. The port valve and exhaust valve are controlled such that when the port valve closes, the exhaust valve opens.

In a second embodiment the present invention provides an air distribution manifold apparatus comprising a manifold body, and a port defined through a wall of the manifold body. A delivery conduit is connected to the port, and a port valve is configured such that when the port valve is open the delivery conduit is connected to an interior of the manifold body through the port, and such that when the port valve is closed, the delivery conduit is disconnected from the interior of the manifold body. A supply conduit is connected at an output end thereof to the interior of the manifold body, and is connected at an input end thereof to receive a product air stream with agricultural products entrained therein. An exhaust conduit is connected at an input end thereof to receive a clean air stream with substantially no agricultural products entrained therein, and connected at an output end thereof to the delivery conduit in proximity to the port. An exhaust valve is configured such that when the exhaust valve is open, the delivery conduit is connected to the exhaust conduit, and such that when the exhaust valve is closed, the delivery conduit is disconnected from the exhaust conduit. The port valve and exhaust valve are controlled such that when the port valve closes, the exhaust valve opens.

In a third embodiment the present invention provides a method of controlling delivery of an agricultural product to a selected section of furrow openers of an air seeder. The method comprises, for each air seeder section providing a delivery conduit connected at an output end thereof to deliver the agricultural product to the section of furrow openers, and connected at an input end thereof to a port defined through a wall of a manifold body; connecting an output end of a supply conduit to an interior of the manifold body, and directing a product air stream with the agricultural product entrained therein into an input end of the supply conduit such that the agricultural product moves through the supply conduit, the manifold body, the ports, and the delivery conduits to each section of furrow openers; closing a selected port to stop the delivery of the agricultural product to the selected section of furrow openers, and exhausting a selected flow of pressurized air from the supply conduit; stopping exhausting the selected flow of pressurized air from the supply conduit and opening the selected port to restart the delivery of the agricultural product to the selected section of furrow openers.

The present invention thus maintains air speed above the critical velocity in the distribution network as ports are closed and opened, and can also clear agricultural products from delivery conduits and manifolds downstream of a closed or blocked port.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic cutaway side view of an embodiment of an air distribution apparatus of the present invention with the port valves open and the exhaust valves closed;

FIG. 2 is a schematic cutaway side view of the embodiment of FIG. 1 with one port valve closed and one exhaust valve open;

FIG. 3 is a schematic front view of an alternate exhaust valve for use with the embodiment of FIG. 1;

FIG. 4 is a schematic cutaway side view of an embodiment of an air distribution apparatus of the present invention where the exhaust is connected to and directed into the delivery conduits, and shown with the port valves open and the exhaust valves closed;

FIG. 5 is a schematic cutaway side view of the embodiment of FIG. 4 with one port valve closed and one exhaust valve open such that exhaust air is directed through the delivery conduit;

FIG. 6 is a schematic top view of the manifold body of the embodiment of FIG. 1;

FIG. 7 is a schematic side view of an embodiment of an air distribution manifold apparatus of the present invention where the supply conduit extends vertically down from the manifold body, and wherein the clean air stream is obtained at a remote source such as directly from the air seeder fan or an auxiliary fan;

FIG. 8 is a schematic cutaway side view a valve body for use with the embodiment of FIG. 4 where the port valve and exhaust valve are connected together such that when one opens the other closes, and vice versa;

FIG. 9 is a schematic top view of an air seeder showing field strips seeded by furrow openers in adjacent sections of furrow openers;

FIG. 10 is a schematic top view of an embodiment of an air distribution manifold apparatus of the present invention where the manifold is an inline flat fan type manifold;

FIG. 11 is a perspective view of an air distribution manifold apparatus of the present invention with plunger type valves;

FIG. 12 is a cutaway view of the valve body of the embodiment of FIG. 12 with the port valve closed and the exhaust valve open;

FIG. 13 is a cutaway view of the valve body of the embodiment of FIG. 12 with the port valve open and the exhaust valve closed.

DETAILED DESCRIPTION OF THE ILLUSTRATED EMBODIMENTS

FIGS. 1 and 2 schematically illustrate an embodiment of an air distribution apparatus 1 of the present invention. The apparatus 1 is shown as part of an air seeder product distribution network. The apparatus 1 comprises a manifold body 3 comprising substantially circular top and bottom plates 5, as illustrated in FIG. 6, oriented substantially horizontally, and a substantially vertical body wall 7 extending between the top and bottom plates 5A, 5B. Ports 9 are defined through the body wall 7, and a delivery conduit 11 is connected to each port 9.

A port valve 13 is configured such that when the port valve 13 is open, as illustrated in FIG. 1, the delivery conduit 11 is connected to the interior of the manifold body 3 through the port 9, and such that when the port valve 13 is closed, as illustrated in FIG. 2, the delivery conduit 11 is disconnected from the interior of the manifold body 3.

A substantially vertically oriented supply conduit 15 is connected at an output end 15A thereof to the interior of the manifold body 3 through an aperture 17 in the top plate 5A. The supply conduit 15 extends substantially vertically up from the manifold body 3 to a curved elbow 19 and then extends substantially horizontally from the elbow 19 to an input end 15B thereof that is connected to receive a product air stream AS with agricultural products 21 entrained therein. The product air stream AS is provided by a conventional air seeder fan and metering system.

An exhaust orifice 33 is defined in the elbow 19 at an inner radius of the elbow 19. An exhaust valve 25 is configured such that when the exhaust valve 25 is open, as schematically illustrated in FIG. 2, a selected flow of pressurized air PA flows from an interior of the supply conduit 15 through the exhaust orifice 33. When the exhaust valve 25 is closed, as schematically illustrated in FIG. 1, pressurized air from the interior of the supply conduit 15 is prevented from flowing through the exhaust orifice 33. The port valve 13 and exhaust valve 25 are controlled such that when the port valve 13 closes, the exhaust valve 25 opens.

In operation when seeding, agricultural products are carried in the air stream AS from the tanks carrying various seed, fertilizer, and/or mixtures of same or like products. The air stream AS and entrained products enter the manifold body 3 which is designed so that substantially equal portions of the air stream AS and agricultural products exit through each port 9 into the delivery conduits 11 and, in the illustrated apparatus, to a secondary manifold 27 which again divides the air stream AS and entrained agricultural products substantially equally to each secondary delivery conduit 29 and then to the furrow openers 31.

When it is desired to turn off the flow of agricultural products 21 to the secondary manifold 27, the port valve 13 is closed, and one of the exhaust valves 25 is opened by a controller 35. The closing of the port valve 13 will typically be triggered by an operator who has visually determined that the furrow openers 31 fed by the secondary manifold 27 are passing through previously seeded soil, or by a global positioning system GPS which has determined the same thing. The air flow in the delivery conduit 11 and downstream from there stops when the port valve 13 closes, and at the same time the exhaust valve 25 opens.

The size of the exhaust orifice 33 is typically configured such that the selected flow of pressurized air PA flowing through the exhaust orifice 33 when the exhaust valve 25 is open is substantially the same as an amount of air flowing through the port 9 when the port valve 13 is open. Thus the volume of air flow through the supply conduit 15 upstream from the elbow 19 is maintained at about the same amount whether the port valve 13 is open or closed, and critical velocity of the product air stream AS will be maintained to prevent agricultural products from falling out of the air stream.

In the illustrated apparatus 1, the exhaust orifices 33 are defined in the wall of the elbow 19 that forms the inner radius of the elbow 19. It has been found that a clean air stream, with substantially no agricultural products entrained therein, can be drawn off the product carrying air stream AS at the inner radius since the agricultural products 21 follow the outer radius of the elbow 19 when making the turn from the horizontal to the vertical direction. Thus the selected flow of pressurized air PA can be drawn out of the supply conduit without losing any product 21.

In the illustrated apparatus 1 as well, the supply conduit 15 extends vertically down from the elbow 19 to the manifold body 3. It can be seen that as pressurized air is drawn off at the elbow 19 through one or more of the exhaust orifices 33, less air is moving through the vertical portion of the supply conduit 15. With the product air stream AS moving downward, the reduced volume of air in the air stream AS does not adversely affect the movement of the entrained product to the manifold 3 as same is drawn down by gravity.

The apparatus 1 comprises first and second ports 9A, 9B, first and second delivery conduits 11A, 11B, and first and second port valves 13A, 13B connecting the corresponding first and second delivery conduits 11A, 11B to the first and second ports 9A, 9B. First and second exhaust orifices 33A, 33B are defined in the inner radius of the elbow 19, and corresponding first and second exhaust valves 25A, 25B for stopping and starting the flow of pressurized air flows from the interior of the supply conduit 15 through the corresponding first and second exhaust orifices 33A, 33B.

The first port valve 13A and first exhaust valve 25A can be controlled such that when the first port valve 13A closes, the first exhaust valve 25A opens, and in the same manner when the second port valve 13B closes, the second exhaust valve 25B opens. The selected flow of pressurized air PA flowing through the exhaust orifices 33A, 33B when the first and second exhaust valves 25A, 25B are open is substantially the same as an amount of air flowing through the first and second ports 9A, 9B when the corresponding first and second port valves 13A, 13B are open.

Where, as is typical, a manifold includes six to eight ports, an exhaust orifice and valve can be provided for each port.

Alternatively a single adjustable exhaust valve 25' can be provided as schematically illustrated in FIG. 3. In a system with the exhaust valve 25', the first and second port valves 13A, 13B and the exhaust valve 25' are controlled such that when the first or the second port valve closes, the exhaust valve 25' opens to a first degree, illustrated by the dotted line D1 such that a first selected flow of pressurized air, substantially equal to the amount of air flowing through one of the ports when one port valve is open, flows from the inner radius of the elbow 19' of the supply conduit through the exhaust orifice 33'. When both the first and the second port valves 13A, 13B close, the exhaust valve 25' opens to a second degree, illustrated by dotted line D2, such that a second selected flow of pressurized air flows from the supply conduit through the exhaust orifice 33' that is substantially the same as the amount of air flowing through the first and second ports when the first and second port valves 13A, 13B are open. Where further ports are provided, further opening of the exhaust valve 25' can be provided as well.

Thus the velocity of the air stream AS in the horizontal portion of the supply conduit is maintained above the critical velocity. In the apparatus 1, the exhaust orifice 33 is open to the atmosphere, such that pressurized air PA from the interior of the supply conduit 15 flows through the exhaust orifice 33 into the atmosphere when the exhaust valve 25 is open.

As illustrated in the apparatus 1' of FIGS. 4 and 5, an exhaust conduit 23 can be connected at an input end 23A thereof to the exhaust orifice 33 and with an output end 23B thereof connected to an exhaust destination, such that the selected flow of pressurized air PA flows through the exhaust conduit 23. The exhaust destination can be selected to suit the particular circumstances, however beneficially in the apparatus 1', the exhaust conduit 23 is connected at the output end 23B thereof to the delivery conduit 11 in proximity to the port 9. Although the exhaust valve could remain on the exhaust orifice 33 at the input end 23A of the exhaust conduit 23, in the illustrated apparatus 1', the exhaust valve 25' is moved to the output end of the exhaust conduit 23 to facilitate mounting the port valve 13 and exhaust valve 25 in a valve assembly as described further below.

Thus when the port valve 13 is closed and the exhaust valve 25' is open, as illustrated in FIG. 5, the delivery conduit 11 is connected to the exhaust conduit 23 and the selected flow of pressurized air PA flows through the exhaust conduit 23 into the delivery conduit 11. Thus instead of the air flow in the delivery conduit 11 and downstream from there immediately stopping as in the prior art gated manifold ports, when the port valve 13 closes, the exhaust valve 25 opens such that a clean air stream, the pressurized air PA with substantially no agricultural products entrained therein, flows from the inner radius of the elbow 19 into the delivery conduit 11 and downstream through the secondary manifold 27 and secondary delivery conduits 29.

Thus the velocity of the air stream AS through the supply conduit 15 upstream from the elbow 19 is maintained and as well, agricultural products remaining in the distribution network downstream from the blocked port are pushed out to the furrow openers 31 so that the products do not fall and block the conduits. When the exhaust valve 25' is closed, as illustrated in FIG. 4, the delivery conduit 11 is disconnected from the exhaust conduit 23 and connected to the port to receive the product air stream AS.

FIG. 7 schematically illustrates a further alternative embodiment with a manifold body 203, ports 209, port valves 213, delivery conduits 211, and supply conduit 215 where the exhaust conduits 223 are connected to a clean air stream CAS that is drawn off the distribution network at some earlier point where a clean air stream might be available, such as directly off the fan output prior to the meter, or from a separate pressurized air source altogether. When the port valve closes, the exhaust valve 225 opens and the clean air stream CAS flows through the delivery conduit to clear agricultural products from any downstream conduits, manifolds, and the like.

FIG. 8 schematically illustrates a convenient configuration comprising a valve assembly 337 connected to the port 309 of the manifold body 303, to the delivery conduit 311, and to the exhaust conduit 323. The port valve 313 and the exhaust valve 325 are incorporated in the valve assembly 337 and are provided by butterfly type valves oriented at 90 degrees and connected to a vertical shaft 339 that rotates at the command of the controller 335. The port valve 313 and exhaust valve 325 are connected such that when the port valve 313 closes the exhaust valve 325 opens, which is the position shown in FIG. 8. Then when the port valve 313 opens, the exhaust valve 325 closes. A known plunger type valve or other such valve as is known in the art could also be used to provide a connected valve that operates as described.

An alternate manifold body 403 is schematically illustrated in FIG. 10. The manifold body 403 is a flat fan type manifold body where the supply conduit 415 directs the product air stream AS into a first end of the a flat manifold body 403 which divides the product air stream AS into channels 461 with the ports 409 at the ends of the channels 461 on a second opposite end of the flat manifold body 403. An exhaust conduit 423 is connected as described above to receive a clean air stream from an exhaust orifice at an upstream elbow, or from another source. A port valve 413 and exhaust valve 425 control flow of either the product air stream AS or exhaust air stream PA to the delivery conduit 411 as described above.

Thus the present invention provides an air stream exhaust to maintain air speed in the supply conduit above the critical velocity. The exhausted air can also be directed into the delivery conduit of the closed port to clear delivery conduits and manifolds downstream, or a separate clean air stream can be directed into the delivery conduit.

A method is provided of controlling delivery of an agricultural product to a selected section of furrow openers 31 of an air seeder 51. In a typical practice of the method the product air stream AS is provided by a conventional air seeder fan and metering system mounted on an air seeder cart 55.

Figure 9:
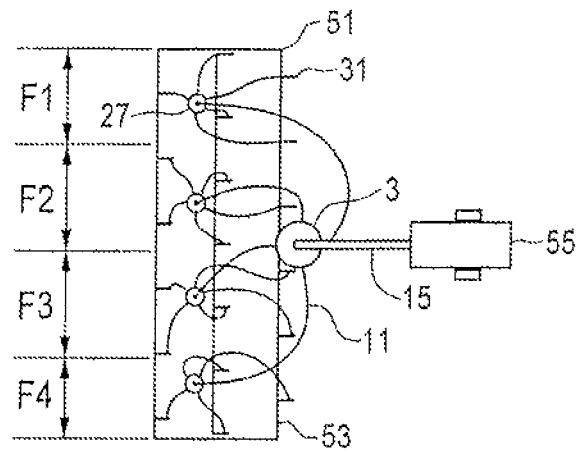
Figure 10:
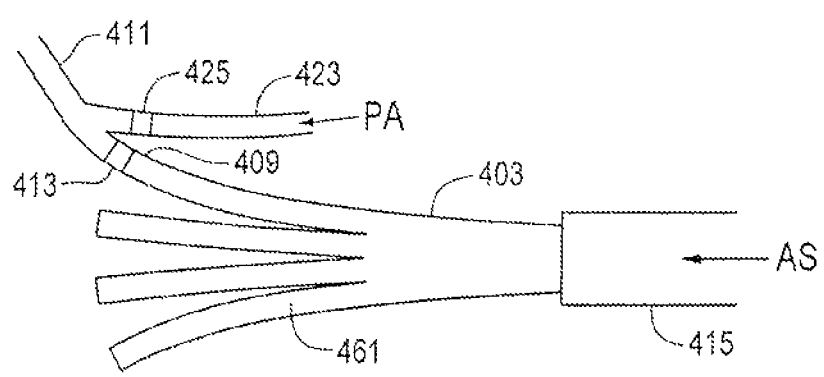

In the embodiment illustrated in FIG. 9, each section of furrow openers comprises a secondary manifold 27 connected to a plurality of furrow openers 31. The furrow openers 31 are spaced laterally across a frame 53 such that all the furrow openers fed by one secondary manifold 27 are laterally spaced from the furrow openers fed by an adjacent secondary manifold 27 such that the furrow openers of one section seed a field strip F1, while the furrow openers fed by an adjacent secondary manifold 27 seed an adjacent field strip F2. Thus as the strip of field area narrows to a width less than the air seeder 51, the flow of agricultural products is directed to selected sections of furrow openers 31 to seed any one or all of field strips F1, F2, F3, F4.

Alternatively each "section" of furrow openers could comprise a single furrow opener fed from a secondary manifold with port and exhaust valves 13, 25 controlling the flow of the product air stream AS to each single furrow opener.

As shown in the accompanying drawings, the method comprises for each air seeder section providing a delivery conduit 11 connected at an output end thereof to deliver the agricultural product to the section of furrow openers 31, and connected at an input end thereof to a port 9 defined through a wall of a manifold body 3; connecting an output end of a supply conduit 15 to an interior of the manifold body 3, and directing a product air stream AS with the agricultural product 21 entrained therein into an input end of the supply conduit 15 such that the agricultural product moves through the supply conduit 15, the manifold body 3, the ports 9, and the delivery conduits 11 to each section of furrow openers 31; closing a selected port 9 to stop the delivery of the agricultural product 21 to a selected section of furrow openers 31 and exhausting a selected flow of pressurized air PA from the supply conduit 15; stopping exhausting the selected flow of pressurized air PA from the supply conduit 15 and opening the selected port 9 to restart the delivery of the agricultural product to the selected section of furrow openers 31.

To avoid exhausting agricultural products entrained in the product air stream, the air seeder is configured such that the supply conduit 15 extends substantially vertically up from the manifold body 3 to a curved elbow 19 and then extends substantially horizontally from the elbow 19, and the selected flow of pressurized air PA is exhausted from the supply conduit 15 through an exhaust orifice 33 defined in the elbow 19 at an inner radius of the elbow 19.

The selected port 9 is closed by providing a port valve 13 configured such that when the port valve 13 is open the delivery conduit 11 is connected to an interior of the manifold body 3 through the port 9, and such that when the port valve 13 is closed, the delivery conduit 11 is disconnected from the interior of the manifold body 3.

The delivery conduits may be cleared of agricultural products by connecting the exhaust orifice 33 to the delivery conduit 11 in proximity to the input end thereof such that the selected flow of pressurized air PA from the supply conduit 15 passes through the delivery conduit 11.

Figure 11:
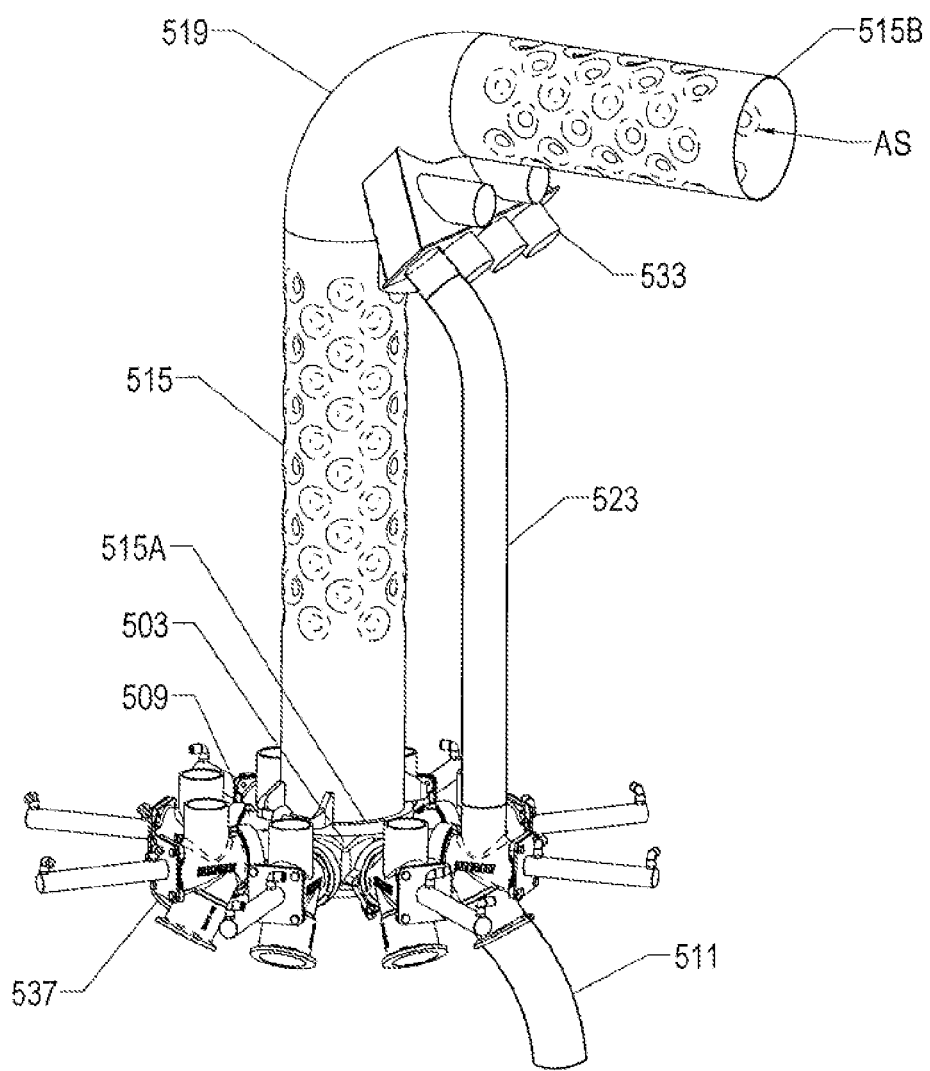
Figure 12:
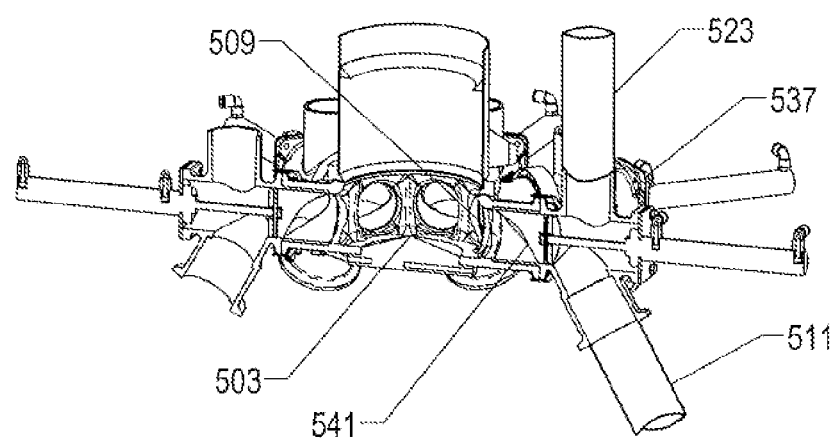
Figure 13:
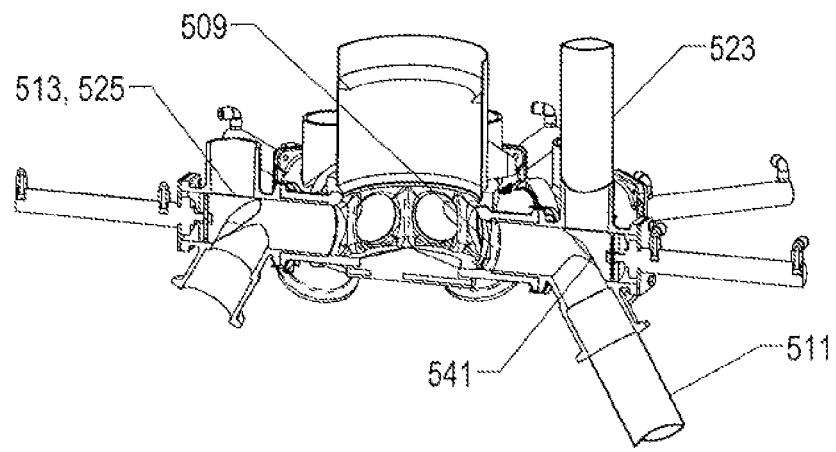

FIGS. 11-13 illustrate an air distribution manifold apparatus 501 that comprises a manifold body 503 with output ports 509, and a valve assembly 537 connected to each port 509. A substantially vertically oriented supply conduit 515 is connected at an output end 515A thereof to the interior of the manifold body 503. The supply conduit 515 extends substantially vertically up from the manifold body 503 to a curved elbow 519 and then extends substantially horizontally from the elbow 519 to an input end 515B thereof that is connected to receive a product air stream AS with agricultural products entrained therein.

A delivery conduit 511, and an exhaust conduit 523 are connected to each valve body 537. Only one of each is shown to allow for better illustration. The exhaust conduits 523 are connected to exhaust orifices 533 at the inner radius of the elbow 519, and the delivery conduits 511 are connected to downstream manifolds or furrow openers. The port valve 513 and the exhaust valve 525 are incorporated in the valve assembly 537 and are provided by a plunger type valve where the valve element 541 provides both the port valve 513 and exhaust valve 525. When the valve element 541 is in the position shown in FIG. 12 the port 509 is blocked by the valve element 541 and the port valve 513 is thus closed, and the exhaust conduit 523 is connected to the delivery conduit 511 and the exhaust valve 525 is thus open. Then when, in response to a control signal, the valve element 541 moves to the position shown in FIG. 13, the port 509 is connected to the delivery conduit 511 and the port valve 513 is thus open, while the passage from the exhaust conduit 523 to the delivery conduit 511 is blocked by the valve element and the exhaust valve 525 is thus closed.

As described above, when the port valve 513 is closed, and the exhaust valve 525 is open, as illustrated in FIG. 12, the delivery conduit 511 is disconnected from the interior of the manifold body 503 and is connected to the clean air stream from the exhaust orifice 533 at the elbow 519, such that clean air flows through the delivery conduit 511. When the port valve 513 is open, and the exhaust valve 525 is closed, as illustrated in FIG. 13, the delivery conduit 511 is connected to the interior of the manifold body 503 and the product bearing air stream AS flows through the delivery conduit 511, and no air flows through the exhaust conduit 523.

As ports are opened and closed the rate of metering agricultural products into the product air stream is adjusted accordingly. The present invention maintains critical velocity of air flow through the distribution network and can also ensure that delivery conduits and/or manifolds downstream from a closed port are clear.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An air distribution apparatus comprising:
   a manifold body, and a plurality of ports defined through a wall of the manifold body;
   a delivery conduit connected to each the port;
   on at least one port; a port valve configured such that when the port valve is open a corresponding delivery conduit is connected to an interior of the manifold body through the at least one port, and such that when the port valve is closed, the corresponding delivery conduit is disconnected from the interior of the manifold body;

a supply conduit connected at an output end thereof to the interior of the manifold body, and connected at an input end thereof to receive a product air stream with agricultural products entrained therein;

wherein the supply conduit extends substantially vertically up from the manifold body to a curved elbow and then extends substantially horizontally from the elbow;

an exhaust orifice defined in the elbow at an inner radius of the elbow, and an exhaust valve configured such that when the exhaust valve is open, a selected flow of pressurized air flows from an interior of the supply conduit through the exhaust orifice, and such that when the exhaust valve is closed, pressurized air from the interior of the supply conduit is prevented from flowing through the exhaust orifice;

wherein the port valve and exhaust valve are controlled such that when the port valve closes, the exhaust valve opens.

2. The apparatus of claim 1 wherein the exhaust orifice is open to atmosphere, such that pressurized air from the interior of the supply conduit flows through the exhaust orifice into the atmosphere when the exhaust valve is open.

3. The apparatus of claim 1 comprising an exhaust conduit connected at an input end thereof to the exhaust orifice and with an output end thereof connected to an exhaust destination, such that the selected flow of pressurized air flows through the exhaust conduit.

4. The apparatus of claim 3 wherein the output end of the exhaust conduit is connected to the corresponding delivery conduit such that the selected flow of pressurized air flows through the corresponding delivery conduit.

5. The apparatus of claim 4 comprising a valve assembly connected to the at least one port, the corresponding delivery conduit, and the exhaust conduit, and wherein the port valve and the exhaust valve are incorporated in the valve assembly.

6. The apparatus of claim 5 wherein the port valve and exhaust valve are connected such that when the port valve closes the exhaust valve opens, and such that when the port valve opens the exhaust valve closes.

7. The apparatus of claim 1 wherein a size of the exhaust orifice is configured such that the selected flow of pressurized air flowing through the exhaust orifice when the exhaust valve is open is substantially the same as an amount of air flowing through the at least one port when the port valve is open.

8. The apparatus of claim 1 wherein the corresponding delivery conduit is connected at an output end thereof to a secondary manifold.

9. The apparatus of claim 1 comprising:

first and second ports defined through a wall of the manifold body;

first and second delivery conduits connected to corresponding first and second ports;

first and second port valves connecting the corresponding first and second delivery conduits to the first and second ports;

first and second exhaust orifices defined in the elbow at an inner radius of the elbow, and corresponding first and second exhaust valves for stopping and starting the flow of pressurized air flows from the interior of the supply conduit through the corresponding first and second exhaust orifices;

wherein the first port valve and first exhaust valve are controlled such that when the first port valve closes, the first exhaust valve opens;

wherein the second port valve and second exhaust valve are controlled such that when the second port valve closes, the second exhaust valve opens.

10. The apparatus of claim 9 wherein the selected flow of pressurized air flowing through the exhaust orifice when the first exhaust valve is open is substantially the same as an amount of air flowing through the first port when the first port valve is open.

11. The apparatus of claim 9 comprising first and second exhaust conduits connected at input ends thereof to corresponding first and second exhaust orifices, and connected at output ends thereof to corresponding first and second delivery conduits.

12. The apparatus of claim 1 comprising:

first and second ports defined through a wall of the manifold body;

first and second delivery conduits connected to corresponding first and second ports;

first and second port valves connecting the corresponding first and second delivery conduits to the first and second ports;

wherein the first and second port valves and the exhaust valve are controlled such that when the first or the second port valve closes, the exhaust valve opens to a first degree such that a first selected flow of pressurized air flows from an interior of the supply conduit through the exhaust orifice, and such that when the first and the second port valve close, the exhaust valve opens to a second degree such that a second selected flow of pressurized air flows from an interior of the supply conduit through the exhaust orifice.

13. The apparatus of claim 12 wherein the first selected flow of pressurized air flowing through the exhaust orifice is substantially the same as an amount of air flowing through the first or second port when the corresponding first or second port valve is open, and wherein the second selected flow of pressurized air flowing through the exhaust orifice is substantially the same as an amount of air flowing through the first and second ports when the corresponding first and second port valves are open.

* * * * *